United States Patent [19]

Bittner

[11] Patent Number: 4,779,834
[45] Date of Patent: Oct. 25, 1988

[54] ENGINE DISPLACEMENT LIMITER
[75] Inventor: Gerald O. Bittner, Romeo, Mich.
[73] Assignee: General Motors Corporation, Detroit, Mich.
[21] Appl. No.: 82,484
[22] Filed: Aug. 7, 1987
[51] Int. Cl.4 .............................................. F16M 1/00
[52] U.S. Cl. .................................. 248/638; 74/579 E; 180/300; 248/659; 248/674
[58] Field of Search ............... 248/638, 635, 674, 659, 248/605; 180/300, 297; 74/579 E

[56] References Cited
U.S. PATENT DOCUMENTS 3,402,782  9/1968  Ljungstrom .................... 180/300 X
3,825,090  7/1974  Runkle et al. ................... 248/659 X
4,240,517  12/1980  Harlow, Jr. et al. ........... 180/300 X
4,518,058  5/1985  Fister et al. ......................... 180/300
4,685,531  8/1987  Kopich .................................. 180/300

Primary Examiner—J. Franklin Foss
Assistant Examiner—David L. Talbott
Attorney, Agent, or Firm—R. L. Phillips

[57] ABSTRACT

A three-point torque strut connected between an engine and support resists rolling of the engine by reactive torque thereon while inducing with a portion of the reactive torque force from the engine a bending moment in the support that counteracts against the remainder of the reactive torque force transmitted by the strut from the engine tending to twist such support.

3 Claims, 2 Drawing Sheets

ENGINE DISPLACEMENT LIMITER

TECHNICAL FIELD

This invention relates to engine displacement limiters and more particularly to torque strut arrangements for limiting engine roll.

BACKGROUND OF THE INVENTION

In those motor vehicle engine installations where the engine tends to roll as a result of a reactive moment to axle torque, it is common practice to connect a torque strut between the engine and the vehicle structure such as an upper cross member or tie bar in the case of a transversely mounted engine and transaxle. Such torque struts typically comprise a straight rigid member that is connected through rubber bushings at opposite ends thereof to the engine and tie bar. With this kind of strut, which because of its connections may be referred to as a 2-point strut, the vertical and fore/aft forces transmitted thereby induce a bending moment at the center of the tie bar which tends to twist and deform same. The tie bar must, of course, be strong enough to adequately resist this bending moment. And where these bending moments are of large magnitude with the larger engines, the bar because of strength gained through large thickness or added reinforcement can constitute substantial weight as well as cost.

SUMMARY OF THE INVENTION

The present invention provides a cost-effective solution to preventing twisting and deformity of the tie bar not by strengthening same but by providing an improved torque strut arrangement that produces a counteracting bending moment in the tie bar that can even allow reduction in its strength requirements. In the improved design which will be referred to as a 3-point torque strut, there is provided a rubber bushed connection between the strut and the engine and a rubber bushed connection between the strut and the tie bar similar to previous practice but now the torque strut is further formed in a triangular shape and is connected by a third rubber bushed connection with the tie bar. This third rubber bushed connecting point is located below the other bushed connection with the tie bar so that the fore/aft force acting thereon induces a bending moment on the tie bar which reacts against the fore/aft force from the upper bushing. The latter force at the upper bushing and the bending moment on the tie bar from the lower bushing counteract against each other and effectively prevent tie bar twisting and deformation that could otherwise occur with a straight or 2-point torque strut. Moreover, by thus offsetting or balancing these forces it is even possible to reduce the strength requirements of a tie bar where before a conventional 2-point strut was employed.

An object of the present invention is thus to provide a new and improved engine displacement limiter.

Another object is to provide a new and improved torque strut for limiting the roll of an engine.

Another object is to provide a new and improved torque strut that induces in the vehicle's engine support structure a bending moment counteracting forces tending to deform such structure.

Another object is to provide a three-point torque strut that resists rolling of an engine by reactive torque thereon while inducing with a portion of the reactive torque force from the engine a bending moment in the vehicle structure to which the strut is connected that counteracts against the remainder of the reactive force transmitted by the strut from the engine tending to twist such vehicle structure.

These and other objects, advantages and features of the present invention will become more apparent from the following detailed description and drawing in which:

DESCRIPTION OF THE PREFERRED EMBODIMENT

Figure 1:
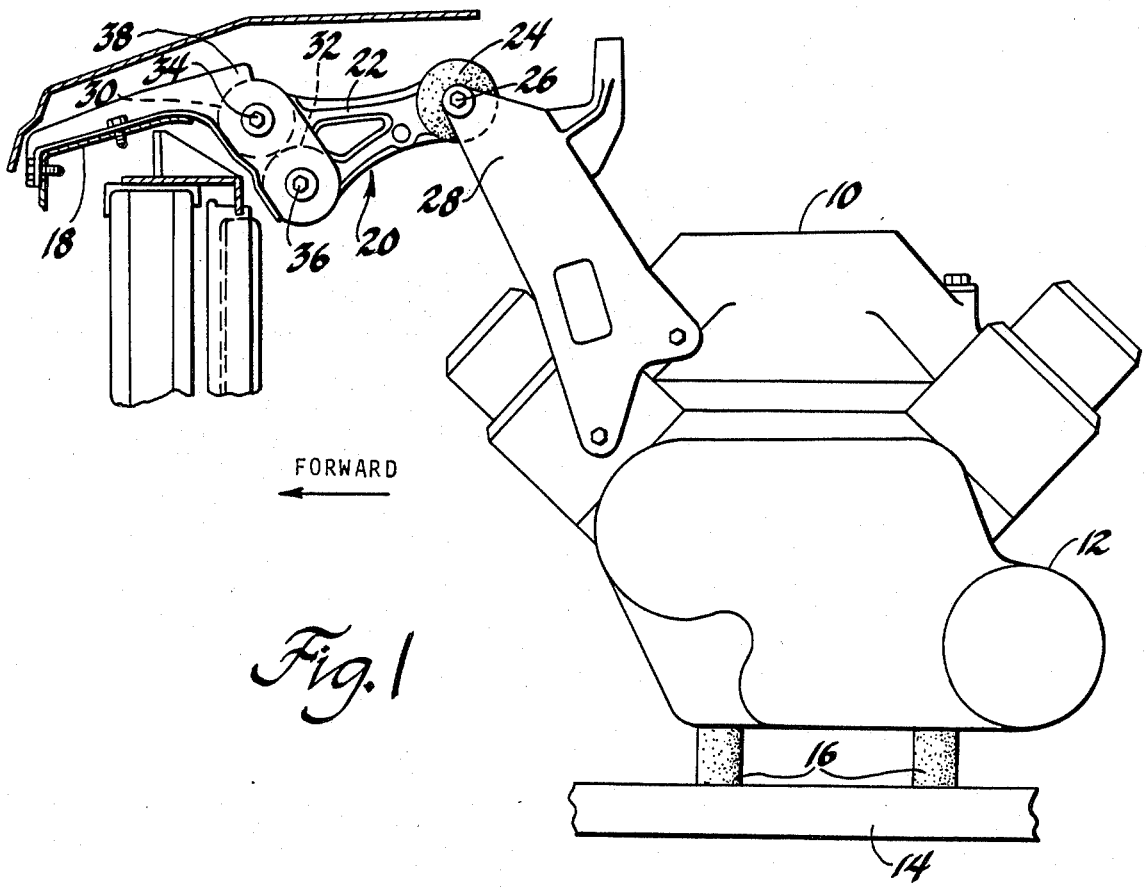
FIG. 1 is a side view of a motor vehicle engine and transaxle installation having a torque strut according to the present invention and with the components located in their design position.
Figure 2:
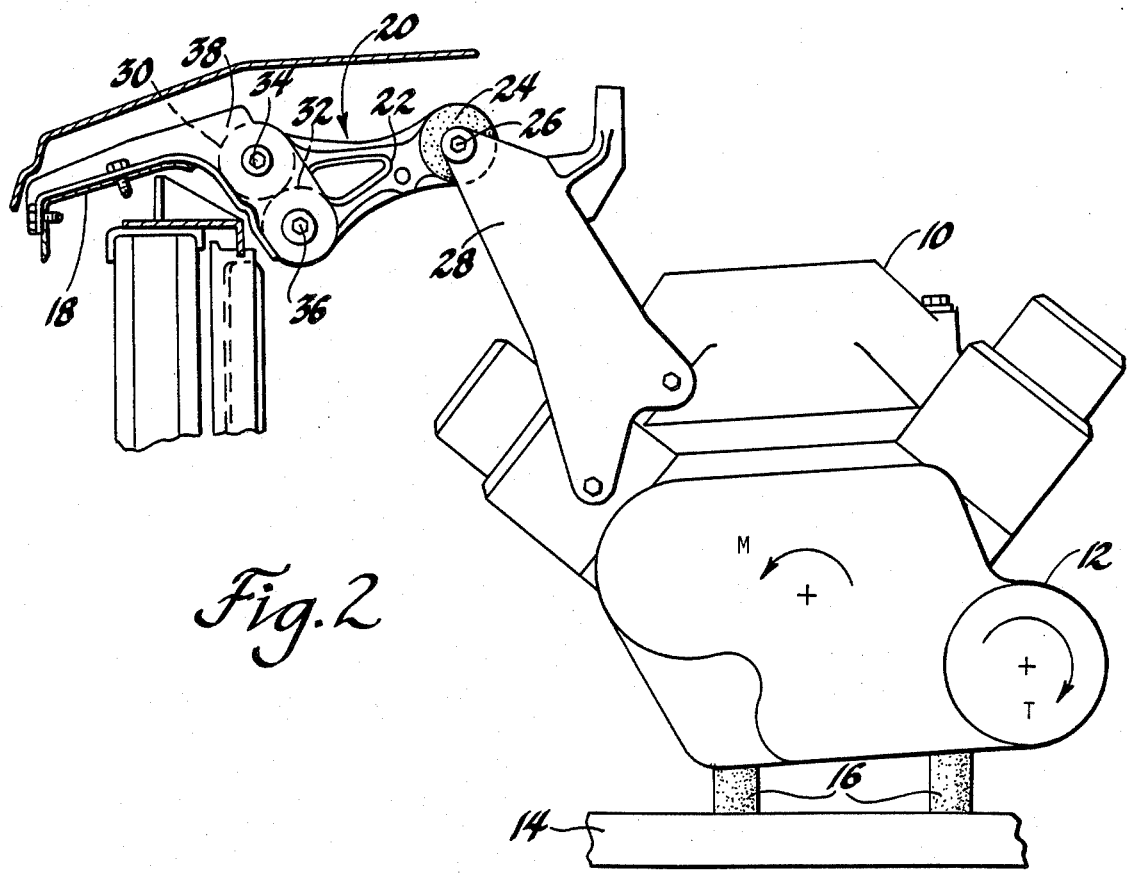
FIG. 2 is a view similar to FIG. 1 but showing the components in a loaded position.

Referring to FIG. 1, there is shown an internal combustion engine 10 and transaxle 12 mounted transversely in the front end of a motor vehicle on supporting structure 14 thereof by rubber engine mounts 16 of conventional design. The engine supporting structure of the vehicle further includes a sheet metal tie bar 18 which extends transversely of the vehicle in an elevated position relative to the engine. And an engine displacement limiter in the form of a torque strut assembly 20 is connected between the engine and tie bar to resist rolling of the engine by a reactive moment M to the axle torque T as depicted in FIG. 2.

Figure 3:
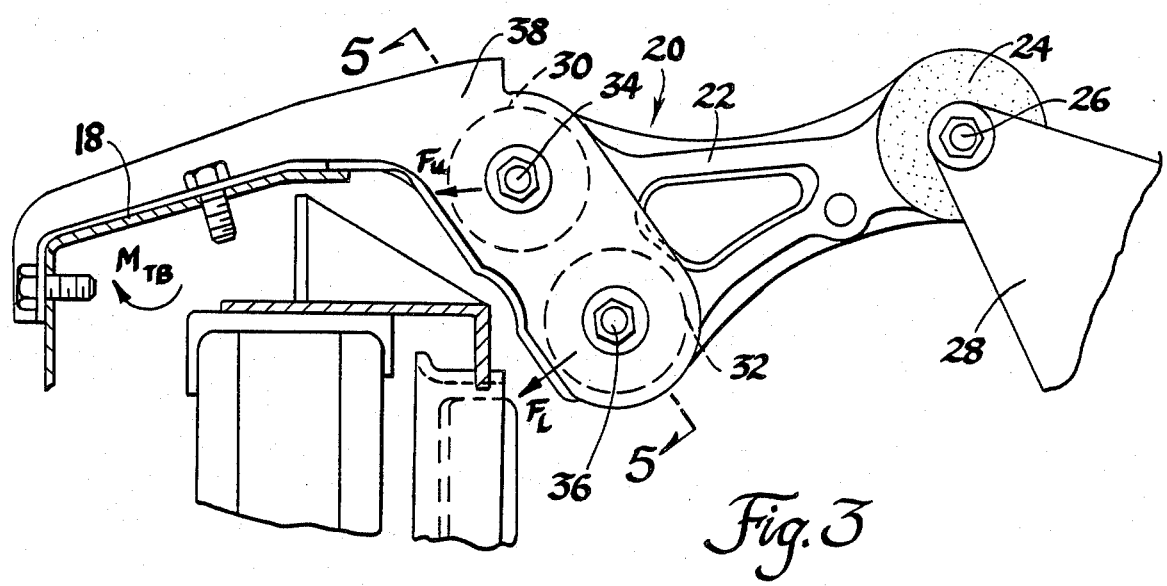
FIG. 3 is an enlarged view of the torque strut installation in FIG. 1.
Figure 4:
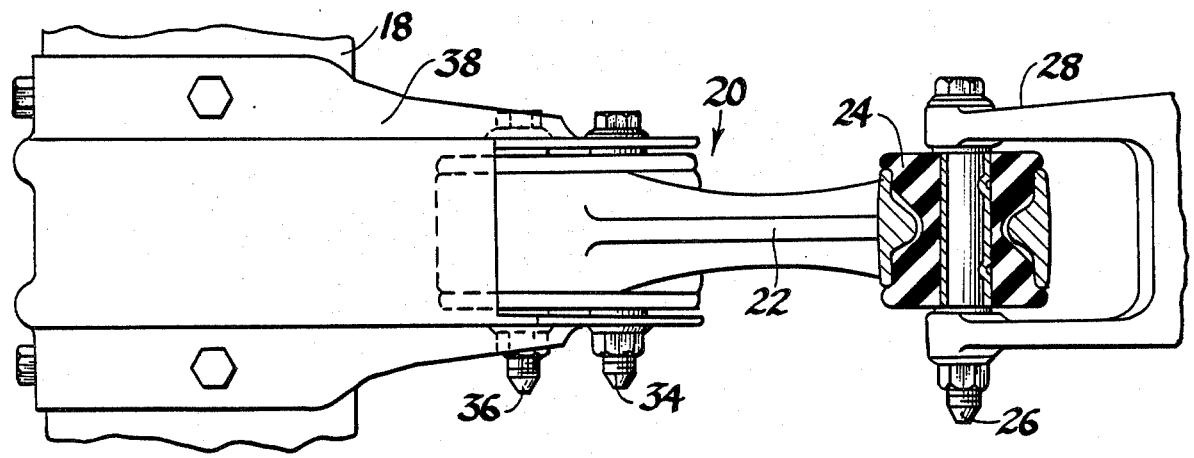
FIG. 4 is a top view of the torque strut installation in FIG. 3.
Figure 5:
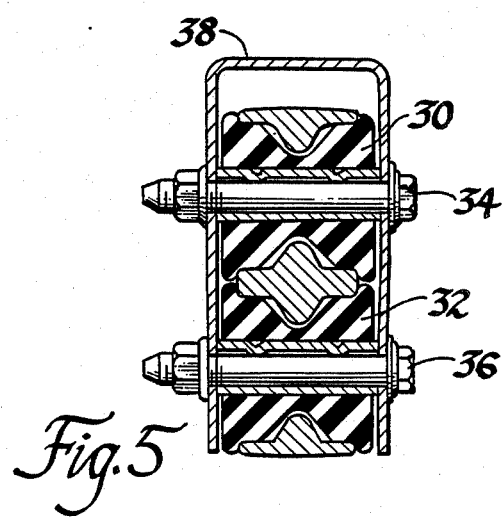
FIG. 5 is a view taken along the line 5—5 in FIG. 3.

The torque strut assembly 20 as best seen in FIGS. 3–5 comprises a rigid triangular shaped torque strut 22 which is connected at the three corners thereof by a rubber bushing 24 and pin assembly 26 to a bracket 28 bolted to the engine and by an upper rubber bushing 30 and lower bushing 32 and pin assemblies 34 and 36 respectively to a bracket 38 bolted to the tie bar 18. The center of the upper tie bar bushing 30 is in a position relative to that of the engine strut bushing 24 such that there is a substantially horizontal line of action between the engine and the tie bar in the transmission of part of the engine's rolling force as depicted by $F_U$ in FIG. 3. The center of the strut's other tie bar bushing 32 is, on the other hand, at a substantially lower position and as a result, the remaining part of the rolling force $F_L$ at the lower bushing of the triangular torque strut induces a bending moment $M_{TB}$ on the tie bar which reacts against the rolling force $F_U$ from the upper bushing 30 as depicted in FIG. 3. The latter force $F_U$ and the bending moment $M_{TB}$ counteract against each other and prevent tie bar twisting and deformation that might otherwise occur with a straight 2-point torque strut rather than the triangular one. And thus it is seen that the triangular strut with the third bushing redirects the tie bar loads into a manageable form that lessens the strength requirements for the tie bar or other roll resisting engine supporting structure.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. An engine, support means, mount means mounting said engine on said support means, and three-point torque strut means including a strut member connected by three substantially parallel pins between said engine and support means for resisting rolling of said engine by reactive torque thereon while inducing with a portion of the reactive torque force from said engine a bending moment in said support means that counteracts against the remainder of the reactive torque force transmitted by said strut means from said engine tending to twist said support means.

2. An engine, support means, mount means mounting said engine on said support means, and three-point torque strut means connected between said engine and support means for resisting rolling of said engine by reactive torque thereon while inducing with a portion of the reactive torque force from said engine a bending moment in said support means that counteracts against the remainder of the reactive torque force transmitted by said strut means from said engine tending to twist said support means, said strut means comprising a triangular shaped strut, first elastomeric bushing and pin means connecting one corner of said strut to said engine, second and third elastomeric bushing and pin means connecting the remaining two corners of said strut to said support means.

3. An engine, support means, mount means mounting said engine on said support means, and three-point torque strut means connected between said engine and support means for resisting rolling of said engine by reactive torque thereon while inducing with a portion of the reactive torque force from said engine a bending moment in said support means that counteracts against the remainder of the reactive torque force transmitted by said strut means from said engine tending to twist said support means, said strut means comprising a triangular shaped strut, first elastomeric bushing and pin means connecting one corner of said strut to said engine, second and third elastomeric bushing and pin means connecting the remaining two corners of said strut to said support means, said second and third elastomeric bushing and pin means being at substantially different elevations.

* * * * *